United States Patent
Hosogai et al.

[11] Patent Number: 6,092,369
[45] Date of Patent: Jul. 25, 2000

[54] CATALYST DETERIORATION-DETERMINING SYSTEM FOR INTERNAL COMBUSTION ENGINES USING COMPRESSED NATURAL GAS

[75] Inventors: Shigeo Hosogai; Hiroshi Kubota; Shigeo Hidai, all of Wako, Japan

[73] Assignee: Honda Giken Kogyo Kabushiki Kaisha, Tokyo, Japan

[21] Appl. No.: 09/195,431

[22] Filed: Nov. 18, 1998

[30] Foreign Application Priority Data

Nov. 25, 1997 [JP] Japan .................................. 9-338282

[51] Int. Cl.[7] ...................................................... F01N 3/00
[52] U.S. Cl. .................. 60/277; 60/276; 60/285; 123/688; 73/118.1
[58] Field of Search ............................ 60/277, 276, 285; 123/688, 703; 73/118.1, 118.2

[56] References Cited

U.S. PATENT DOCUMENTS

| | | | |
|---|---|---|---|
| 5,381,657 | 1/1995 | Takizawa et al. | 60/276 |
| 5,636,514 | 6/1997 | Seki | 60/277 |
| 5,839,274 | 11/1998 | Remboski et al. | 60/274 |
| 5,966,930 | 10/1999 | Hatano et al. | 60/276 |

FOREIGN PATENT DOCUMENTS 5-248227  9/1993  Japan .

Primary Examiner—Thomas Denion
Assistant Examiner—Binh Tran
Attorney, Agent, or Firm—Arent Fox Kintner Plotkin & Kahn PLLC

[57] ABSTRACT

A catalyst deterioration-determining system for an internal combustion engine has a catalyst arranged in the exhaust system, for purifying exhaust gases emitted from the engine, an oxygen concentration sensor arranged in the exhaust system at a location downstream of the catalyst, for detecting the concentration of oxygen present in the exhaust gases, and an ECU which controls the air-fuel ratio of an air-fuel mixture supplied to the engine in a feedback manner in response to the output from the oxygen concentration sensor. Determination of deterioration of the catalyst is carried out based on the output from the oxygen concentration sensor during execution of air-fuel ratio feedback control. An inversion period parameter representative of a repetition period of change in the output from the oxygen concentration sensor over a predetermined diagnosis period is measured, and a determination parameter is calculated by averaging values of the inversion period parameter measured over different diagnosis periods as the predetermined diagnosis period. The determination of deterioration of the catalyst is carried out based on the determination parameter.

4 Claims, 11 Drawing Sheets

CATALYST DETERIORATION-DETERMINING SYSTEM FOR INTERNAL COMBUSTION ENGINES USING COMPRESSED NATURAL GAS

BACKGROUND OF THE INVENTION

1. Field of the Invention

This invention relates to a catalyst deterioration-determining system for internal combustion engines using a compressed natural gas, which determines deterioration of a catalyst arranged in the exhaust system of the engine, for purifying exhaust gases emitted from the engine.

2. Prior Art

A catalyst deterioration-determining system is known, e.g. from Japanese Laid-Open Patent Publication (Kokai) No. 5-248227, which determines deterioration of a catalyst provided in the exhaust passage of an internal combustion engine, which controls the air-fuel ratio of an air-fuel mixture supplied to the engine in a feedback manner responsive to an output from an oxygen concentration sensor arranged in the exhaust passage at a location downstream of the catalyst, determines that the catalyst is deteriorated, when a period of change of the output of the oxygen concentration sensor is shorter than a predetermined reference value which is set based upon the temperature of the catalyst.

The known system, however, suffers from the following problem if it is employed in an internal combustion engine using a compressed natural gas (hereinafter referred to as "CNG") instead of gasoline.

That is, CNG contains methane as a main ingredient. The methane cannot be easily oxidized by the catalyst so that part of unburnt methane in exhaust gases emitted from the engine flows downstream of the catalyst. In such an event, if the electrode temperature of the oxygen concentration sensor is high, reaction of the unburnt methane with oxygen is promoted at or in the vicinity of the electrodes of the sensor, whereby the unburnt methane burns. This causes consumption of oxygen in the vicinity of the electrodes so that the partial pressure of oxygen in the vicinity of the electrodes changes in such a direction that the period of change of the output of the oxygen concentration sensor becomes shorter. FIG. 1 shows an output characteristic of the oxygen concentration sensor obtained in the above event. In the figure, T1, T2 and T3 represent values of the temperature TSO2 of the sensor element and are in the relationship of T1<T2<T3. As shown in the figure, as the sensor element temperature TSO2 rises, the period of change TPRD of the sensor output becomes shorter.

In the known catalyst deterioration-determining system, the predetermined reference value with which the period of change of the output of the oxygen concentration sensor is compared is set based upon the temperature of the catalyst, as mentioned above. However, the setting of the predetermined reference value does not take into consideration the temperature of the oxygen concentration sensor. Consequently, when the above manner of determining deterioration of the catalyst is applied to an internal combustion engine using CNG as fuel, there is a possibility that the catalyst is determined to be deteriorated even when the catalyst is not actually deteriorated.

SUMMARY OF THE INVENTION

It is the object of the invention to provide a catalyst deterioration-determining system for internal combustion engines using CNG as fuel, which is capable of determining the deterioration degree of a catalyst arranged in the exhaust system of the engine with high accuracy.

To attain the above object, the present invention provides a catalyst deterioration-determining system for an internal combustion engine using a compressed natural gas and having an exhaust system, catalyst means arranged in the exhaust system, for purifying exhaust gases emitted from the engine, oxygen concentration-detecting means arranged in the exhaust system at a location downstream of the catalyst means, for detecting concentration of oxygen present in the exhaust gases, and air-fuel ratio control means for controlling an air-fuel ratio of an air-fuel mixture supplied to the engine in a feedback manner in response to an output from the oxygen concentration-detecting means, the catalyst deterioration-determining system including catalyst deterioration-determining means for determining that the catalyst means is deteriorated when a period of change of the output from the oxygen concentration-detecting means during execution of air-fuel ratio feedback control by the air-fuel ratio control means is shorter than a predetermined determination reference value.

The catalyst deterioration-determining system is characterized by comprising:

influence degree-detecting means for detecting a degree of influence of oxidation of a particular component of the compressed natural gas in a vicinity of the oxygen concentration sensor; and determination reference value-setting means for setting the predetermined determination reference value, in dependence on the degree of influence of oxidation of the particular component detected by the influence degree-detecting means.

Preferably, the influence degree-detecting means detects the degree of influence of oxidation of the particular component, based upon at least one of an average of the output from the oxygen concentration-detecting means, a maximum value of the average value, and an average value of the maximum value, which are obtained during execution of air-fuel ratio feedback control by the air-fuel ratio control means.

Also preferably, the determination reference value-setting means changes the predetermined determination reference value in a direction of making it more difficult to determine that the catalyst means is deteriorated, when the degree of influence of oxidation of the particular component exceeds a predetermined degree.

More preferably, the influence degree-detecting means detects the degree of influence of oxidation of the particular component, based upon a result of comparison between the at least one of the average of the output from the oxygen concentration-detecting means, the maximum value of the average value, and the average value of the maximum value and a predetermined value which is set by taking temperature of the oxygen concentration sensor into account.

The above and other objects, features, and advantages of the invention will become more apparent from the following detailed description taken in conjunction with the accompanying drawings.

DETAILED DESCRIPTION

The invention will now be described in detail with reference to the drawings showing embodiments thereof.

Figure 1:
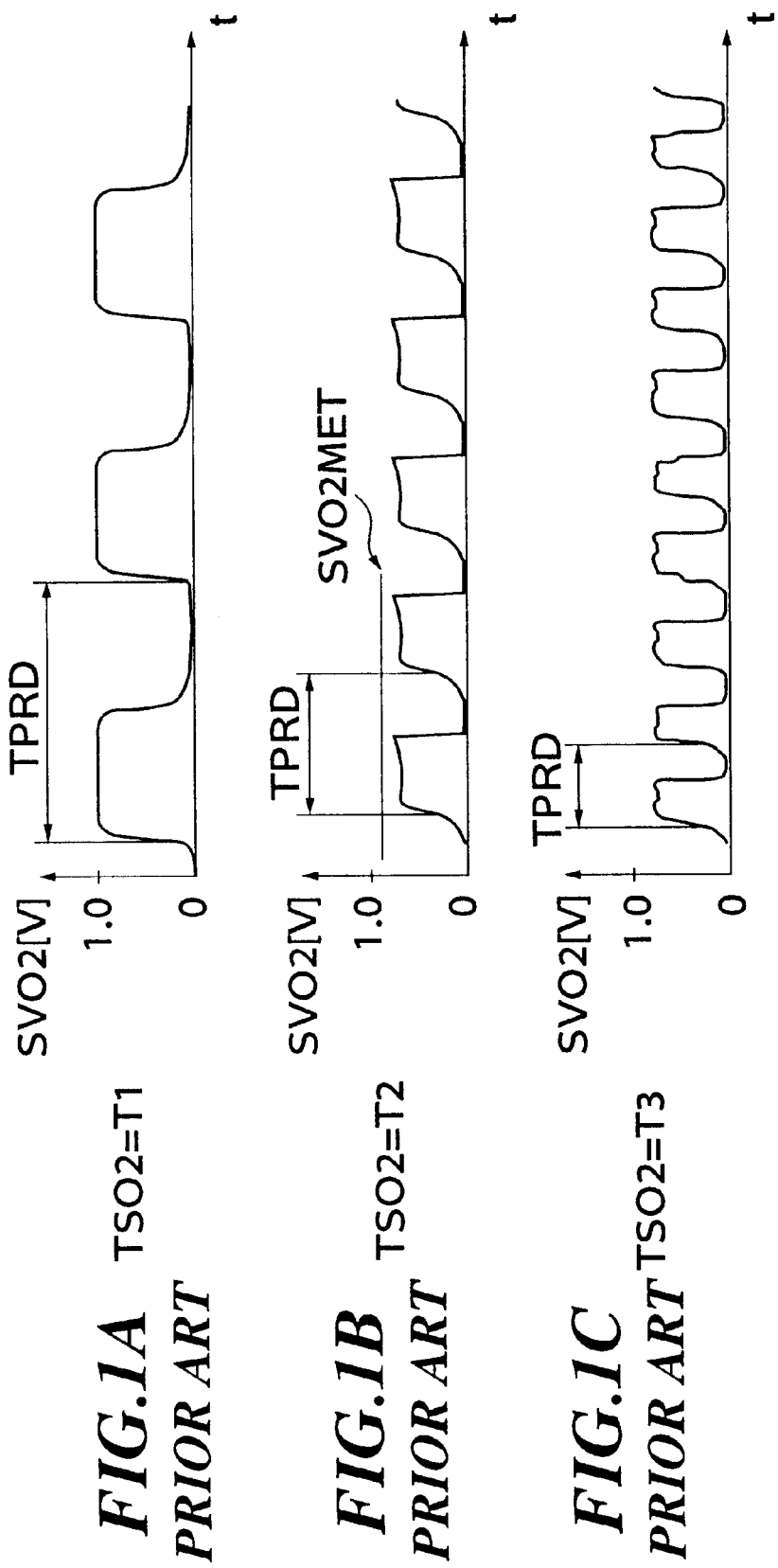
FIGS. 1A, 1B and 1C are timing charts useful in explaining the relationship between the temperature of an oxygen concentration (O2) sensor and an output characteristic of the sensor.
Figure 2:
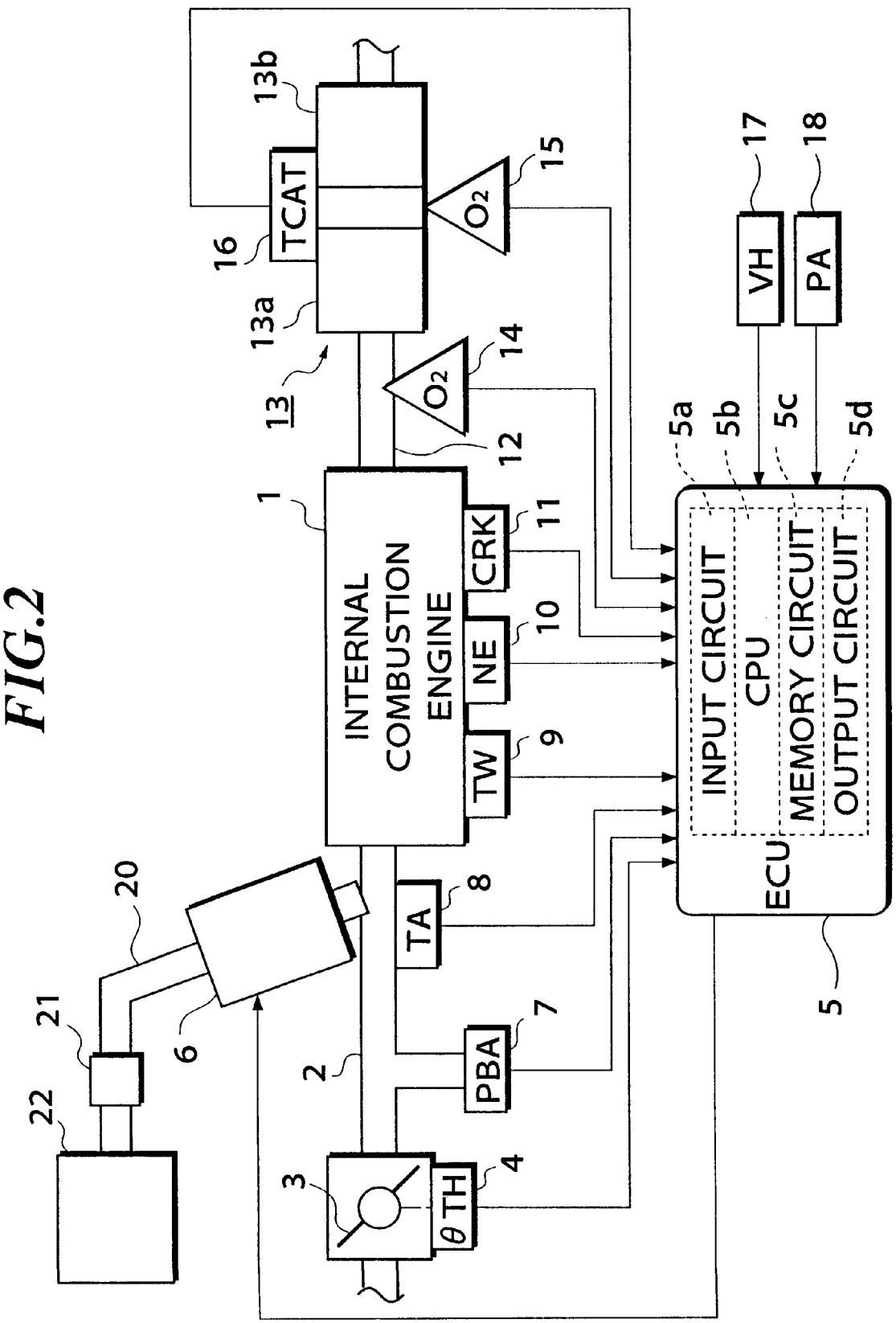
FIG. 2 is a block diagram schematically showing the whole arrangement of an internal combustion engine using CNG as fuel and a catalyst deterioration-determining system therefor, according to an embodiment of the invention.

Referring first to FIG. 2, there is schematically illustrated the whole arrangement of an internal combustion engine using CNG as fuel and a catalyst deterioration-determining system therefor, according to an embodiment of the invention. In the figure, reference numeral 1 designates an internal combustion engine using CNG as fuel and having four cylinders (hereinafter simply referred to as "the engine"). Connected to the cylinder block of the engine 1 is an intake pipe 2 in which is arranged a throttle valve 3. A throttle valve opening ($\theta$TH) sensor 4 is connected to the throttle valve 3, for generating an electric signal indicative of the sensed throttle valve opening $\theta$TH and supplying the same to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom. The fuel injection valves 6 are connected to a CNG tank 22 storing CNG as fuel though a fuel passage 20 with a pressure regulator 21 provided threacross.

Further, an intake pipe absolute pressure (PBA) sensor 7 is provided in communication with the interior of the intake pipe 2, at a location immediately downstream of the throttle valve 3, for supplying an electric signal indicative of the sensed absolute pressure PBA within the intake pipe 2 to the ECU 5. An intake air temperature (TA) sensor 8 is inserted into the interior of the intake pipe 2 at a location downstream of the PBA sensor 7, for supplying an electric signal indicative of the sensed intake air temperature TA to the ECU 5.

An engine coolant temperature (TW) sensor 9 formed of a thermistor or the like is mounted in the cylinder block, for supplying an electric signal indicative of the sensed engine coolant temperature TW to the ECU 5. An engine rotational speed (NE) sensor 10 and a CRK sensor 11 are arranged in facing relation to a camshaft or a crankshaft of the engine 1, neither of which is shown. The NE sensor 10 generates a pulse as a TDC signal pulse at each of predetermined crank angles whenever the crankshaft rotates through 180 degrees, and supplies the same to the ECU 5. The CRK sensor 11 generates a pulse as a CRK signal pulse at each of predetermined crank angles whenever the crankshaft rotates through 45 degrees, and supplies the same to the ECU 5.

A three-way catalyst (hereinafter merely referred to as "the catalyst") 13 is arranged in an exhaust pipe 12 connected to the cylinder block of the engine 1, for purifying exhaust gases emitted from the engine. The catalyst 13 is comprised of an upstream catalyst 13a and a downstream catalyst 13b. An upstream O2 sensor 14 as oxygen concentration-detecting means is arranged in the exhaust pipe 12 at a location upstream of the catalyst 13, and a downstream O2 sensor 15 as oxygen concentration-detecting means is arranged in the catalyst 13 at a location between the upstream and downstream catalysts 13a and 13b. The O2 sensors 14 and 15 both detect the concentration of oxygen present in exhaust gases, and supply signals indicative of the sensed oxygen concentration values (PVO2 and SVO2) to the ECU 5. Further, a catalyst temperature (TCAT) sensor 16 is mounted in the catalyst 13, for supplying an electric signal indicative of the sensed TCAT value to the ECU 5.

Alternatively, the downstream O2 sensor 15 may be arranged downstream of the downstream catalyst 13b.

Further electrically connected to the ECU 5 are a vehicle speed (VH) sensor 17 for detecting the vehicle speed VH of a vehicle in which the engine 1 is installed, and an atmospheric pressure (PA) sensor 18 for detecting the atmospheric pressure PA. Electric signals indicative of the sensed vehicle speed VH and atmospheric pressure PA are supplied to the ECU 5.

The ECU 5 is comprised of an input circuit 5a having the functions of shaping the waveforms of input signals from various sensors including ones mentioned above, shifting the voltage levels of sensor output signals to a predetermined level, converting analog signals from analog-output sensors to digital signals, and so forth, a central processing unit (hereinafter referred to as the "the CPU") 5b, a memory circuit 5c storing various operational programs which are executed by the CPU 5b, and for storing results of calculations therefrom, etc., and an output circuit 5d which outputs driving signals to the fuel injection valves 6, etc.

The CPU 5b operates in response to the above-mentioned various engine parameter signals from the various sensors to determine operating conditions in which the engine 1 is operating, such as an air-fuel ratio feedback control region where the air-fuel ratio is controlled in response to the oxygen concentration in the exhaust gases, and open-loop control regions other than the air-fuel ratio feedback control region, and calculates, based upon the determined engine operating conditions, a fuel injection period TOUT over which the fuel injection valves 6 are to be opened by the use of the following equation (1), in synchronism with generation of TDC signal pulses:

$$TOUT = TIM \times KO2 \times K1 + K2 \tag{1}$$

where TIM represents a basic value of the fuel injection period TOUT of the fuel injection valves 6, which is read from a TIM map determined according to the engine rotational speed NE and the intake pipe absolute pressure PBA. The TIM map is set such that map values are read according to the NE and PBA values so as to control the air-fuel ratio of an air-fuel mixture supplied to the engine to a value substantially equal to a stoichiometric air-fuel ratio. The basic fuel injection period TIM assumes a value almost proportional to the amount of intake air supplied to the engine (weight flow).

KO2 represents an air-fuel ratio correction coefficient (hereinafter referred to simply as "the correction coefficient"), which is determined based on the concentration of oxygen present in exhaust gases detected by the O2 sensors 14 and 15 when the engine 1 is operating in the air-fuel ratio feedback control region, while it is set to predetermined values corresponding to respective open-loop control regions of the engine when the engine 1 is in the open-loop control regions.

K1 and K2 represent other correction coefficients and correction variables, respectively, which are set according to engine operating parameters to such values as optimize operating characteristics of the engine, such as fuel consumption and engine accelerability.

The CPU 5b supplies a driving signal to the fuel injection valves 6 via the output circuit 5d, for opening the same, based on the fuel injection period TOUT obtained by the above calculation.

Next, a manner of determining deterioration (deterioration monitoring) of the catalyst 13 will be described.

Air-fuel ratio feedback control for deterioration monitoring of the catalyst 13 is carried out based on the output SVO2 from the downstream O2 sensor 15 alone. Further, a measurement is made of a time period TL from the time the output SVO2 is inverted from a leaner side to a richer side with respect to a predetermined reference voltage SVREF to the time the output SVO2 is inverted in an opposite direction to the above, and a time period TR from the time the output SVO2 is inverted from the richer side to the leaner side with respect to the reference voltage SVREF to the time the output SVO2 is inverted in an opposite direction to the above. Deterioration of the catalyst 13 is determined based on the thus measured TL and TR time periods (see FIG. 8).

Figure 3:
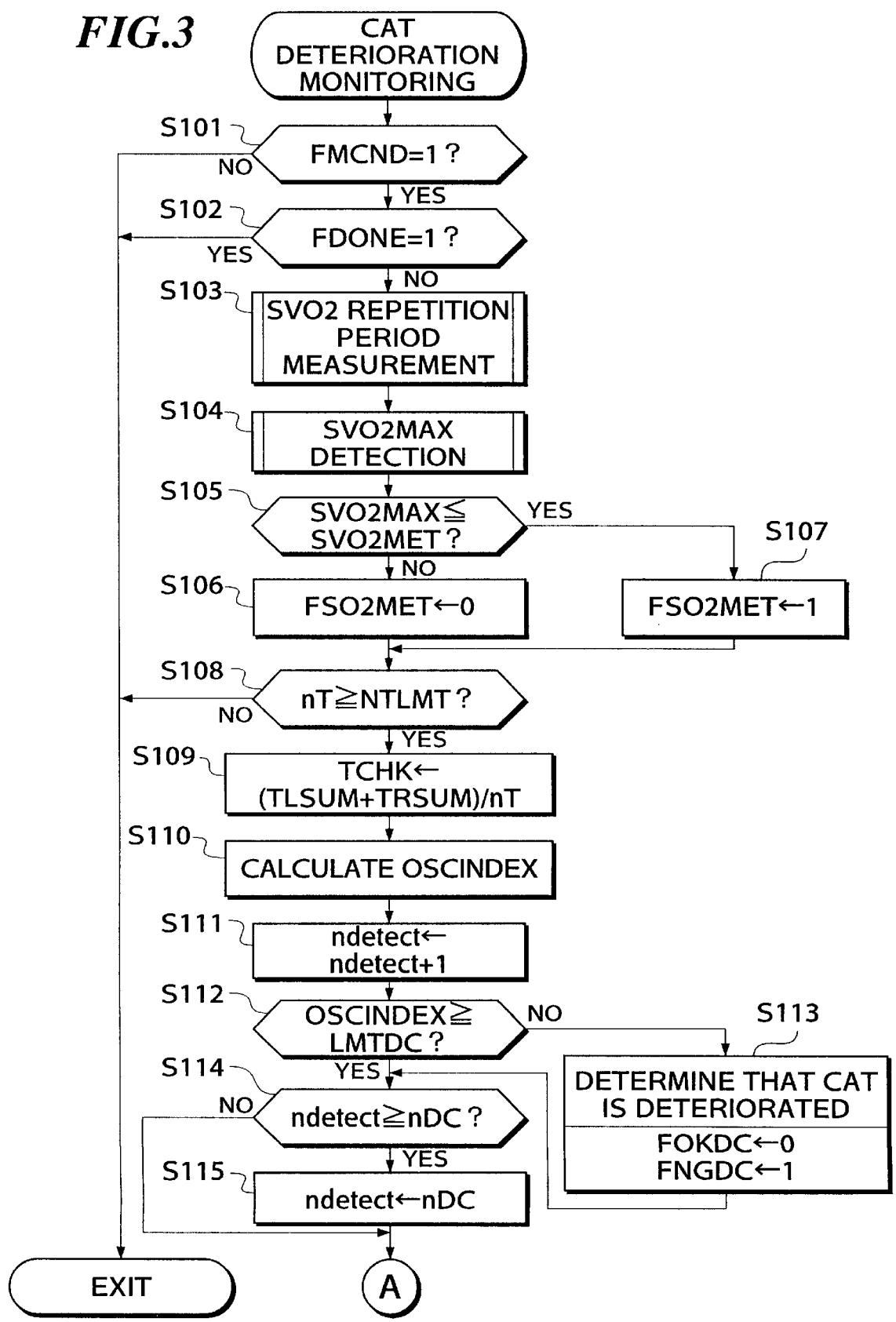
FIG. 3 is a flowchart showing a main routine for carrying out catalyst deterioration determination.
Figure 4:
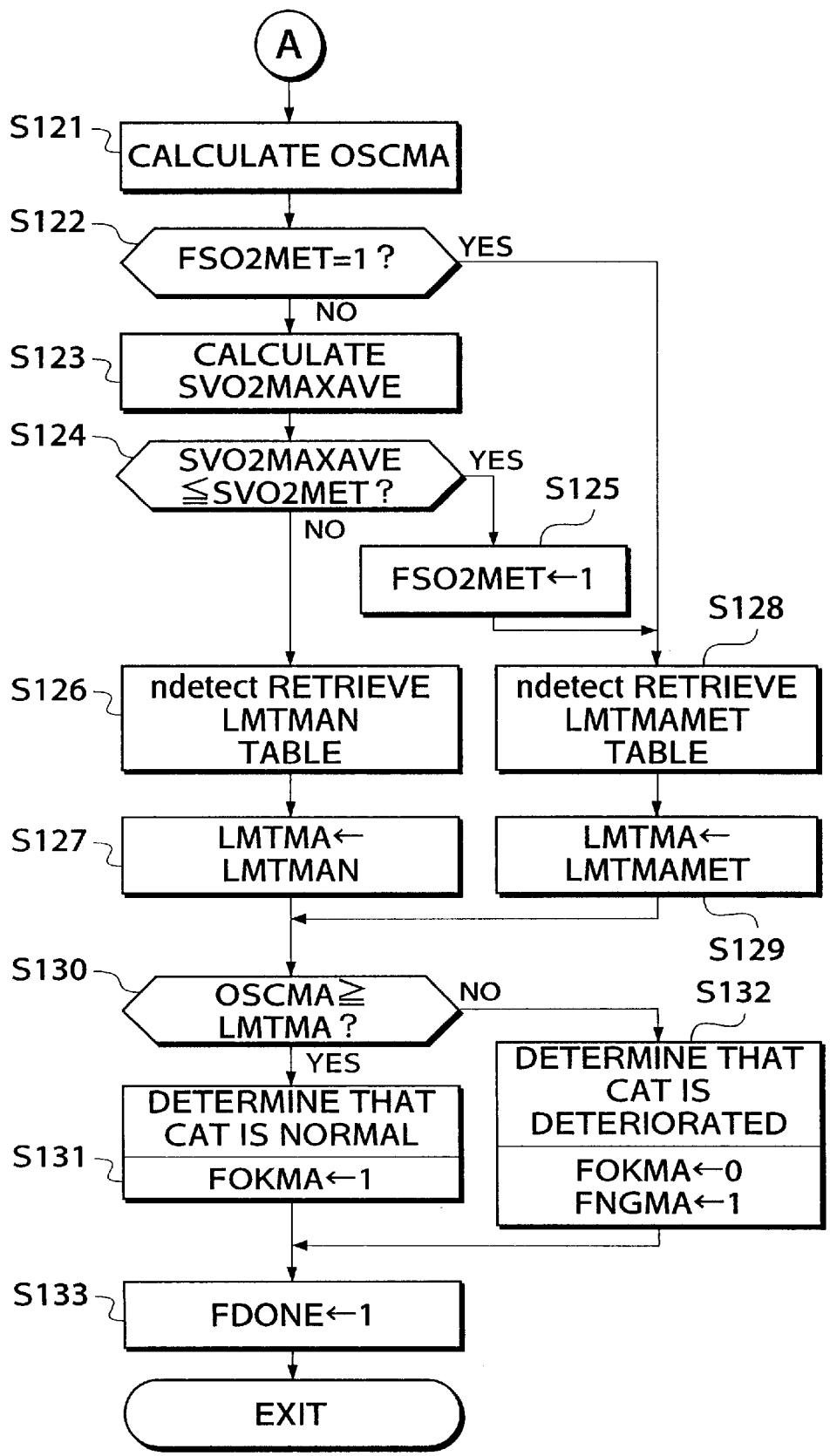
FIG. 4 is a flowchart showing a continued part of the flowchart of FIG. 3.

FIGS. 3 and 4 show a main routine for carrying out the catalyst deterioration monitoring, which is executed by the CPU 5b at predetermined time intervals (e.g. 10 msec).

First, at a step S101, it is determined whether or not a precondition flag FMCND which, when set to "1", indicates that preconditions for executing the deterioration monitoring (hereinafter referred to as "the preconditions") are satisfied, is equal to "1". If FMCND=0 holds, the program is immediately terminated.

Figure 5:
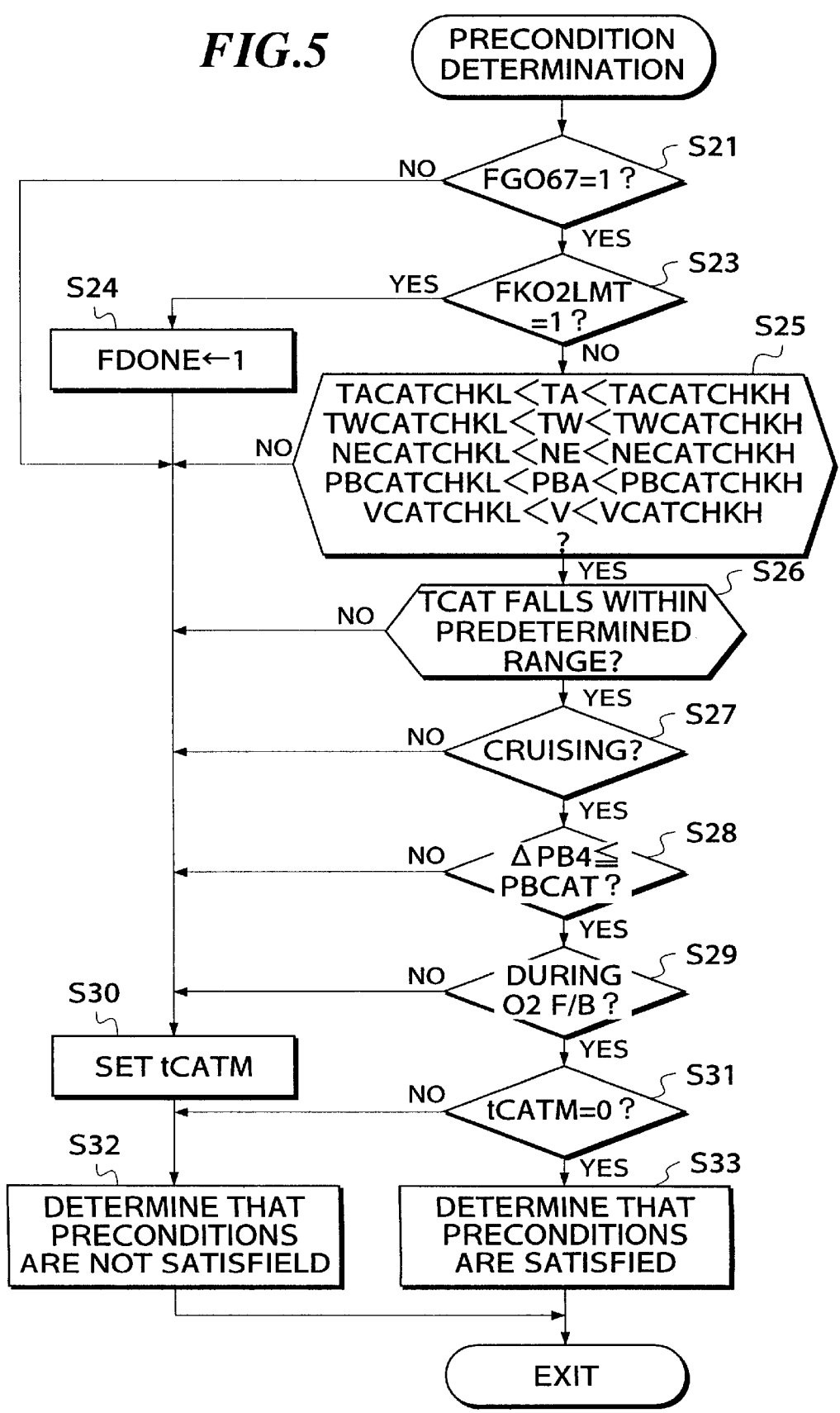
FIG. 5 is a subroutine for determining whether or not preconditions for carrying out the catalyst deterioration determination are satisfied, which is executed at a step S1 in FIG. 4.

A precondition-determining process (process for setting the precondition flag FMCND) will now be described with reference to FIG. 5.

First, it is determined at a step S21 whether or not a monitoring permission flag FGO67 is equal to "1". The flag FGO67 is set to "0". e.g. during execution of monitoring other than the catalyst deterioration monitoring, such as an O2 sensor deterioration monitoring, an evaporative emission control system failure monitoring, and a fuel supply system abnormality monitoring, and to "1" when these monitorings other than the catalyst deterioration monitoring are not being executed. If the flag FGO67 is equal to "0", which means that some other monitoring is being executed, a timer tCATM is set to a predetermined time period TCATM and started at a step S30, and it is determined at a step S32 that the monitoring preconditions are not fulfilled.

If the flag FGO67 is equal to "1" and hence the catalyst deterioration monitoring is permitted, it is determined at a step S23 whether or not a limit flag FKO2LMT is equal to "1". The limit flag FKO2LMT, when set to "1", indicates that the correction coefficient KO2 has been held at a predetermined upper or lower limit value over a predetermined time period or more (in a held-to-KO2 limit state).

If FKO2LMT=1 holds and hence the correction coefficient KO2 is in the held-to-KO2 limit state, a completion flag FDONE which, when set to "1", indicates that the catalyst deterioration monitoring has been completed, is set to "1" at a step S24, followed by the program proceeding to the step S30.

If FKO2LMT=0 holds and hence the correction coefficient KO2 is not in the held-to-KO2 limit state, it is further determined at a step S25 whether or not the intake air temperature TA is within a range defined by a predetermined upper limit value TACATCHKH (e.g. 100° C.) and a predetermined lower limit value TACATCHKL (e.g. –0.2° C.), whether or not the engine coolant temperature TW is within a range defined by a predetermined upper limit value TWCATCHKH (e.g. 100° C.) and a predetermined lower limit value TWCATCHKL (e.g. 80° C.), whether or not the engine rotational speed NE is within a range defined by a predetermined upper limit value NECATCHKH (e.g. 3500 rpm) and a predetermined lower limit value NECATCHKL (e.g. 1000 rpm), whether or not the intake pipe absolute pressure PBA is within a range defined by a predetermined upper limit value PBCATCHKH (e.g. 510 mmHg) and a predetermined lower limit value PBCATCHKL (e.g. 300 mmHg), and whether or not the vehicle speed VH is within a range defined by a predetermined upper limit value VHCATCHKH (e.g. 80 km/h) and a predetermined lower limit value VHCATCHKL (e.g. 32 km/h). If these engine operating parameters are all within the above respective ranges, it is further determined at a step S26 whether or not the catalyst temperature TCAT of the catalyst 13 is within a predetermined range (of e.g. 350° C. to 800° C.). In the present embodiment, the catalyst temperature TCAT is detected by the catalyst temperature sensor 16, but a temperature value estimated from engine operating parameters may be used, instead.

If the catalyst temperature TCAT is within the predetermined range, it is further determined at a step S27 whether or not the vehicle is cruising. This determination is carried out e.g. by determining whether or not the variation in the vehicle speed VH has continually been below 0.8 km/h per sec. over a predetermined time period (e.g. 2 sec). If the vehicle is cruising, it is determined at a step S28 whether or not the intake pipe absolute pressure PBA has an amount of variation ΔPBA (e.g. over 5 msec.) which is below a predetermined value PBCAT (e.g. 16 mmHg). If the amount of variation ΔPBA is below the predetermined value PBCAT, it is further determined at a step S29 whether or not the air-fuel ratio feedback control responsive to the output PVO2 from the upstream O2 sensor 14 is being executed.

If any of the answers to the questions of the steps S25 to S29 is negative (NO), the program proceeds to the step S30, whereas if all the answers are affirmative (YES), i.e. if the engine is in a predetermined condition for carrying out the catalyst monitoring, it is determined at a step S31 whether or not the count value of the down-counting timer tCATM which has been set and started at the step S30 is equal to "0". When this question is first made, tCATM>0 holds, and hence the monitoring preconditions are not determined to be fulfilled (at the step S32). The monitoring preconditions are fulfilled only after the engine has been in the above-mentioned predetermined condition over the predetermined time period TCATM (e.g. 5 sec), and then the precondition flag FMCND is set to "1" at a step S33, followed by terminating the present routine.

Referring again to FIG. 3, if FMCND=1 holds, i.e. if the preconditions are satisfied, then it is determined at a step S102 whether or not the completion flag FDONE is equal to "1". If FDONE=1 holds, the program is immediately terminated, whereas if FDONE=0 holds, an SVO2 repetition period-measuring process is executed at a step S103.

Figure 6:
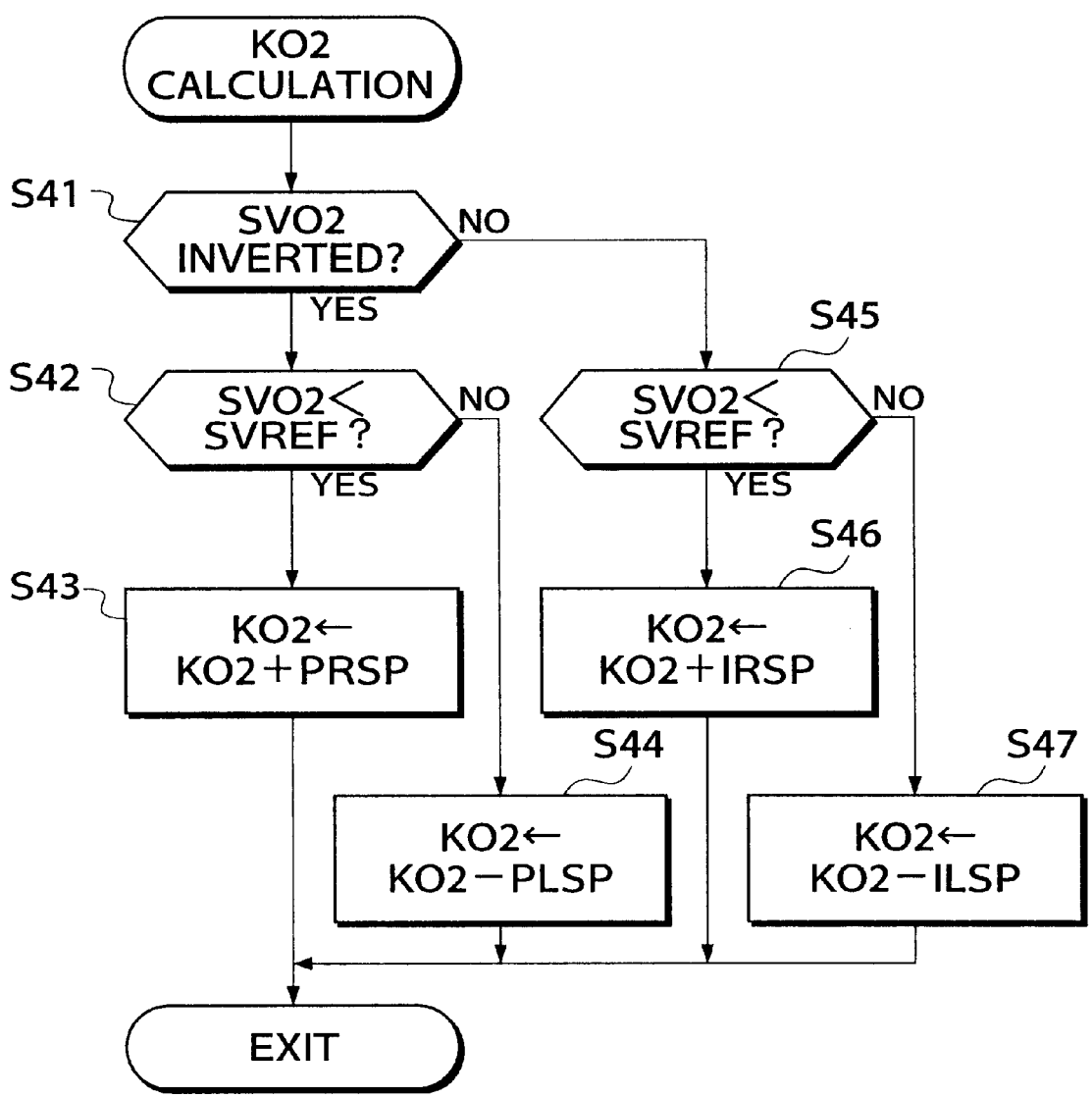
FIG. 6 is a flowchart showing a subroutine for calculating an air-fuel ratio correction coefficient KO2 during the catalyst deterioration determination.
Figure 7:
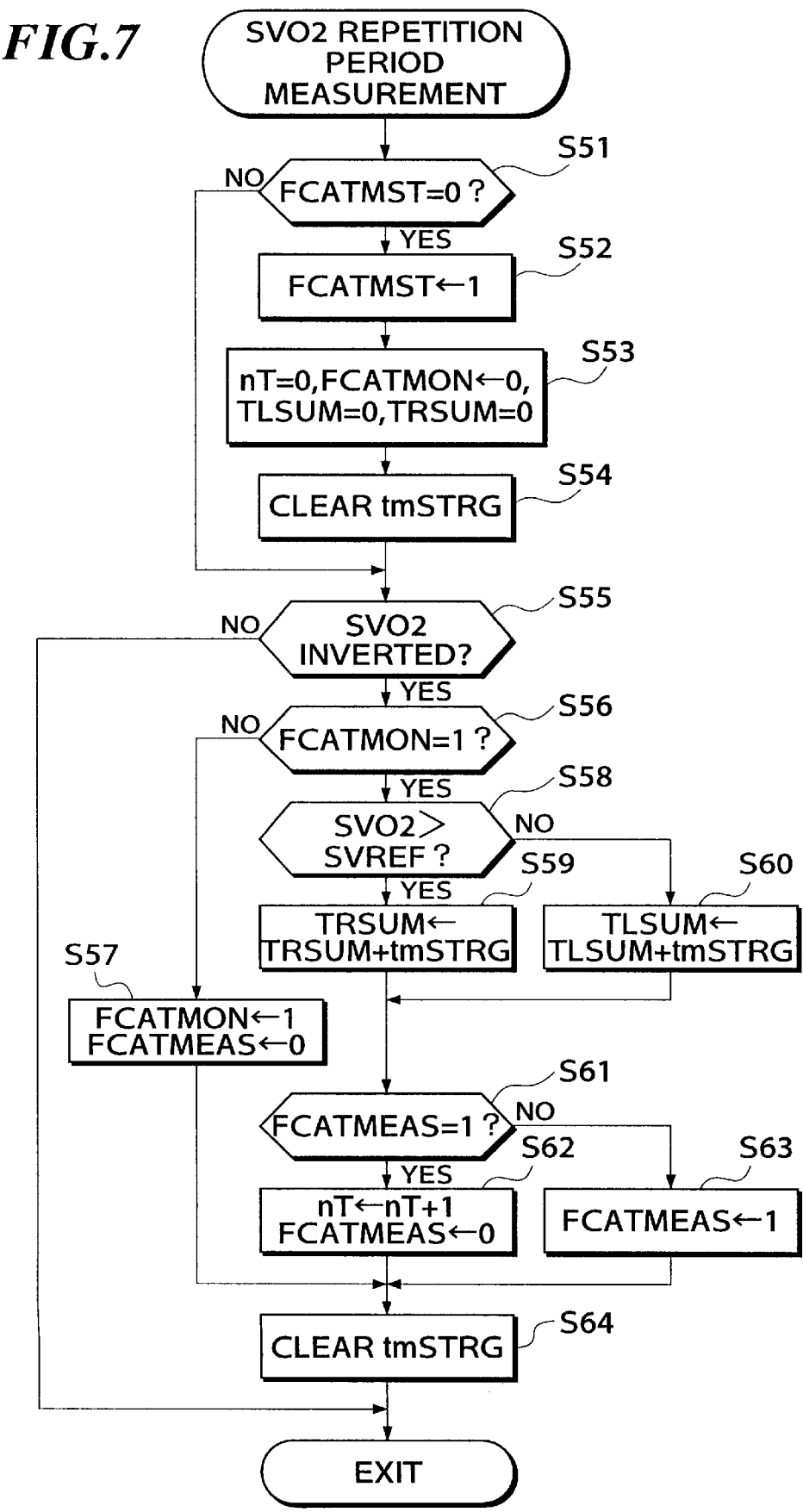
FIG. 7 is a flowchart showing a subroutine for measuring an inversion period of an output SVO2 from a downstream O2 sensor, which is executed at a step S3 in FIG. 3.

FIG. 7 shows a subroutine for carrying out the inversion period-measuring process. If FMCND=1 and FDONE=0 hold at the respective steps S101 and S102 in FIG. 3, the air-fuel ratio correction coefficient KO2 is calculated based on the output SVO2 from the downstream O2 sensor 15 to carry out the air-fuel ratio feedback control. Therefore, a manner of calculating the KO2 value will first be described with reference to FIG. 6.

At a step S41 in FIG. 6, it is determined whether or not the relationship in value between the output SV02 and the reference voltage SVREF has been inverted. If the relationship has been inverted, it is determined at a step S42 whether or not the output SVO2 is lower than the reference voltage SVREF. If SVO2<SVREF holds, a rich-side special P term PRSP is added to an immediately preceding value of the KO2 value at a step S43. On the other hand, if SVO2≧SVREF holds, proportional control is executed, namely, a lean-side special P term PLSP is subtracted from the immediately preceding value of the KO2 value at a step S44.

If the answer to the question of the step S41 is negative (NO), integral control is carried out. That is, it is determined at a step S45 whether or not the output SVO2 is lower than the reference voltage SVREF. If SVO2<SVREF holds, a special I term IRSP is added to an immediately preceding value of the KO2 value at a step S46. On the other hand, if SVO2≧SVREF holds, a special I term ILSP is subtracted from the immediately preceding value of the KO2 value at a step S47.

Figure 8:
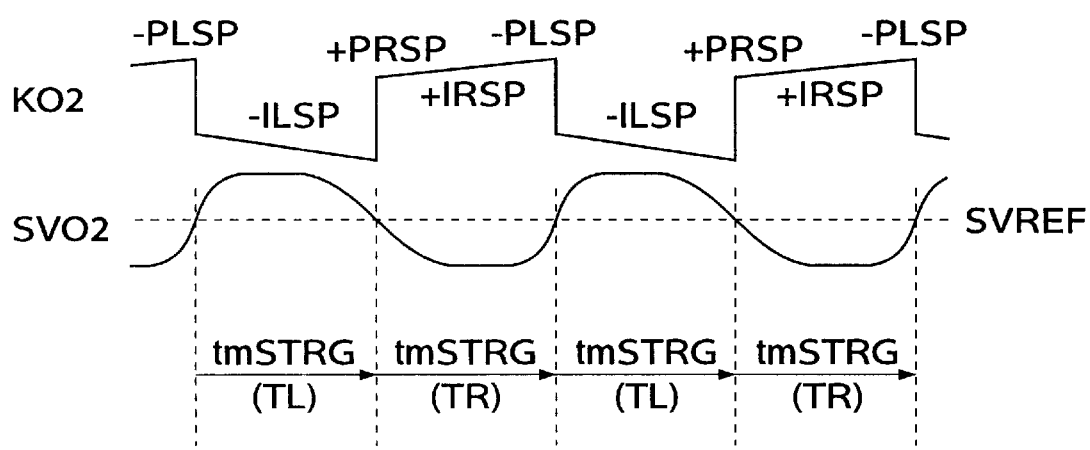
FIG. 8 is a timing chart which is useful in explaining a manner of calculating the air-fuel ratio correction coefficient KO2.

By executing the FIG. 6 process, the correction coefficient KO2 is periodically changed in response to the downstream O2 sensor output SVO2, as shown in FIG. 8. The inversion period of the sensor output SVO2 will be referred to hereinafter as "the SVO2 repetition period".

Next, the SVO2 repetition period-measuring process will be described with reference to FIG. 7.

First, at a step S51, it is determined whether or not an initialization flag FCATMST which, when set to "0", indicates that the present program is executed for the first time, is equal to "0". When this question is first made, FCATMST=0 holds, and then the program proceeds to a step S52, wherein the flag FCATMST is set to "1". Then, at a step S53, various parameters are initialized. More specifically, a counter nT for counting the number of times of measurement of the inversion period, a measurement-starting flag FCATMON which, when set to "1", indicates that the measurement of the inversion period has been started, an integrated value TLSUM of the time period TL, and an integrated value TRSUM of the time period TR are all set to "0". At the following step S54, an inversion period-measuring up-counting timer tmSTRG is set to "0", followed by the program proceeding to a step S55.

When the step S51 is executed in the following loop, FCATMST=1 holds, and therefore the program jumps from the step S51 to the step S55.

At the step S55, it is determined whether or not the relationship in value between the downstream O2 sensor output SVO2 and the reference voltage SVREF has been inverted, and if the relationship has not been inverted, the program is immediately terminated. On the other hand, if it has been inverted, it is determined at a step S56 whether or not the measurement-starting flag FCATMON is equal to "1". When this question is first made, FCATMON=0 holds, and then the flag FCATMON is set to "1" and a measurement-supervising flag FCATMEAS is set to "0" at a step S57, followed by the program proceeding to a step S64. The measurement-supervising flag FCATMEAS is provided for executing measurement of the time periods TL and TR an even number of times regardless of whether the first measurement is started with measurement of the time period TL or the time period TR (i.e. for executing measurement of the integrated value TRSUM the same number of times as that of measurement of the integrated value TLSUM). At the step S64, the timer tmSTRG is set to "0", followed by terminating the present routine.

On the other hand, if FCATMON=1 holds at the step S56, it is determined at a step S58 whether or not the output SVO2 is higher than the reference voltage SVREF. If SVO2>SVREF holds, the count value of the timer tmSTRG is added to an immediately preceding value of the integrated value TRSUM to obtain a present value of the integrated value TRSUM at a step S59, followed by the program proceeding to a step S61. On the other hand, if SVO2≦SVREF holds, the count value of the timer tmSTRG is added to an immediately preceding value of the integrated value TLSUM to obtain a present value of the integrated value TLSUM at a step S60, followed by the program proceeding to the step S61. The count value of the timer tmSTRG immediately after inversion of the output SVO2 is equal to the time period TL or TR, as shown in FIG. 8, and therefore a value (TRSUM+TLSUM) is equal to an integrated value of the SVO2 repetition period (inversion period of the sensor output).

At the step S61, it is determined whether or not the measurement-supervising flag FCATMEAS is equal to "1". When this question is first made, FCATMEAS=0holds, and then the flag FCATMEAS is set to "1" at a step S63, followed by the program proceeding to the step S64. On the other hand, if FCATMEAS=1 holds and hence the execution of the measurement in the present loop is an even-number-th execution of the measurement, the count value of the counter nT is incremented by "1" and the flag FCATMEAS is set to "0" at a step S62, followed by the program proceeding to the step S64.

Figure 9:
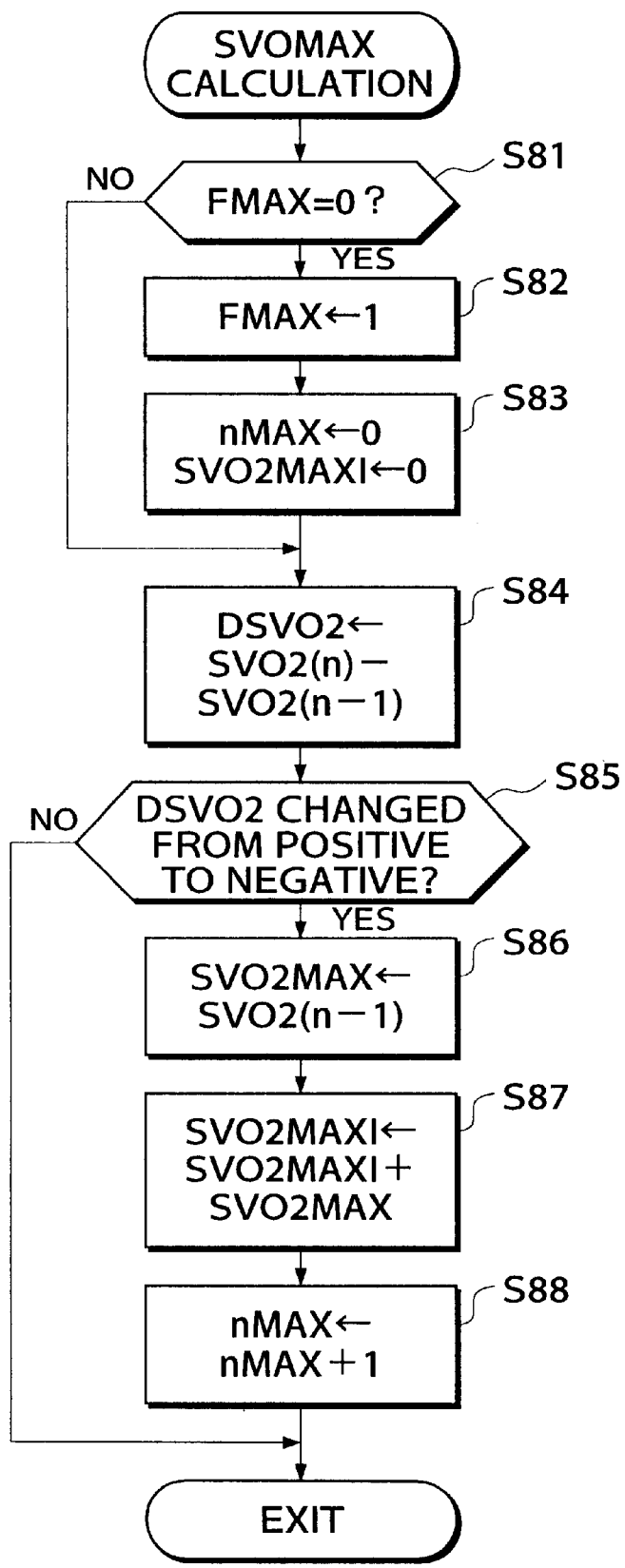
FIG. 9 is a flowchart showing a subroutine for detecting a maximum value of output of an O2 sensor at a step S104 in FIG. 3.

Referring again to FIG. 3, a SVO2MAX-detecting process shown in FIG. 9 is carried out. This process is for detecting a maximum value SVO2MAX of the output SVO2 of the downstream O2 sensor 15 and calculating an integrated value SVO2MAXI of the maximum value SVO2MAX.

At a step S81 in FIG. 9, it is determined whether or not an initializing flag FMAX, which, when set to "0", indicates that the present process is executed for the first time, is equal to "0". If the present process is first executed, FMAX=0 holds, and then the program proceeds to a step S82, wherein the flag FMAX is set to "1", and the value of a counter nMAX for counting a number of times of detection of the maximum value SVO2MAXI and the integrated value SVO2MAXI are both set to "0" at a step S83. followed by the program proceeding to a step S84.

At the step S84, an amount of change DSVO2 is calculated by subtracting an immediately preceding value SVO2 (n−1) of the downstream O2 sensor output from a present value SVO2(n) of the same, and then it is determined at a step S85 whether or not the amount of change DSVO2 has changed in sign from a positive value to a negative value. If the answer is negative (NO), the program is immediately terminated, whereas if it is affirmative (YES), the maximum value SVO2MAX is set to the immediately preceding value SVO2(n−1) at a step S86. Then, the integrated value SVO2MAXI is calculated by the use of the following equation (2) at a step S87, and the counter nMAX is incremented by 1 at a step S88, followed by terminating the program:

$$SVO2MAXI=SVO2MAXI+SVO2MAX \qquad (2)$$

Referring again to FIG. 3, it is determined whether or not the maximum value SVO2MAX detected at the step S104 is equal to or smaller than a predetermined output value SVO2MET. The predetermined output value SVO2MET is set to an almost middle value between the maximum value (=approx. 1.v V) of the output of the downstream O2 sensor 15 that can be assumed when the temperature TSO2 of the sensor 15 is low (TSO2=T1 (e.g. lower than 400° C.)) and the maximum value of the sensor output that can be assumed when the sensor temperature TSO2 is high (TSO2=T2 (e.g. 500° C.)).

If SVO2MAX≦SVO2MET holds at the step S105, which means that the temperature of the O2 sensor 15 is high, an oxidation promotion flag FSO2MET, which, when set to "1", indicates that the influence of oxidation of methane in the vicinity of the the downstream O2 sensor 15 is so large that it cannot be ignored, is set to "1" at a step S107, whereas if SVO2MAX>SVO2MET holds, the oxidation promotion flag FSO2MET is set to "0" at a step S106, followed by the program proceeding to a step S108.

At the step S108, it is determined whether or not the value of the counter nT, i.e. the number of times of measurement of the inversion period is larger than a predetermined value NTLMT (e.g. 3). So long as nT<NTLMT holds, the program is immediately terminated. Thus, the SVO2 repetition period-measuring process and the SVO2MAX-detecting process are repeatedly executed until nT=NTLMT holds, and then the program proceeds to a step S109.

At the step S109, a determination time period TCHK is calculated, which is an average value of the SVO2 repetition period measured the number of times NTLMT, by the use of the following equation (3). The predetermined value NTLMT may be alternatively set to "1", and if it is so set, the determination time period TCHK is just equal to the measured SVO2 repetition period:

$$TCHK=(TLSUM+TRSUM)/nT \qquad (3)$$

At the following step S110, a first determination parameter OSCINDEX is calculated, which is representative of the oxygen storage capacity of the catalyst 13 by the use of the following equation (4). The thus calculated parameter OSCINDEX is stored in a ring buffer backed up by a battery of the engine to prevent the stored content therein from being erased even when an ignition switch of the engine, not shown, is turned off:

$$OSCINDEX=TCHK \times GAIRSUM \qquad (4)$$

where GAIRSUM represents an integrated value of a parameter representative of a flow rate of exhaust gases obtained during measurement of the SVO2 repetition period (hereinafter referred to as "the flow rate integrated value"). The GAIRSUM value is calculated by a program of FIG. 10, which is executed in synchronism with generation of TDC signal pulses.

Figure 10:
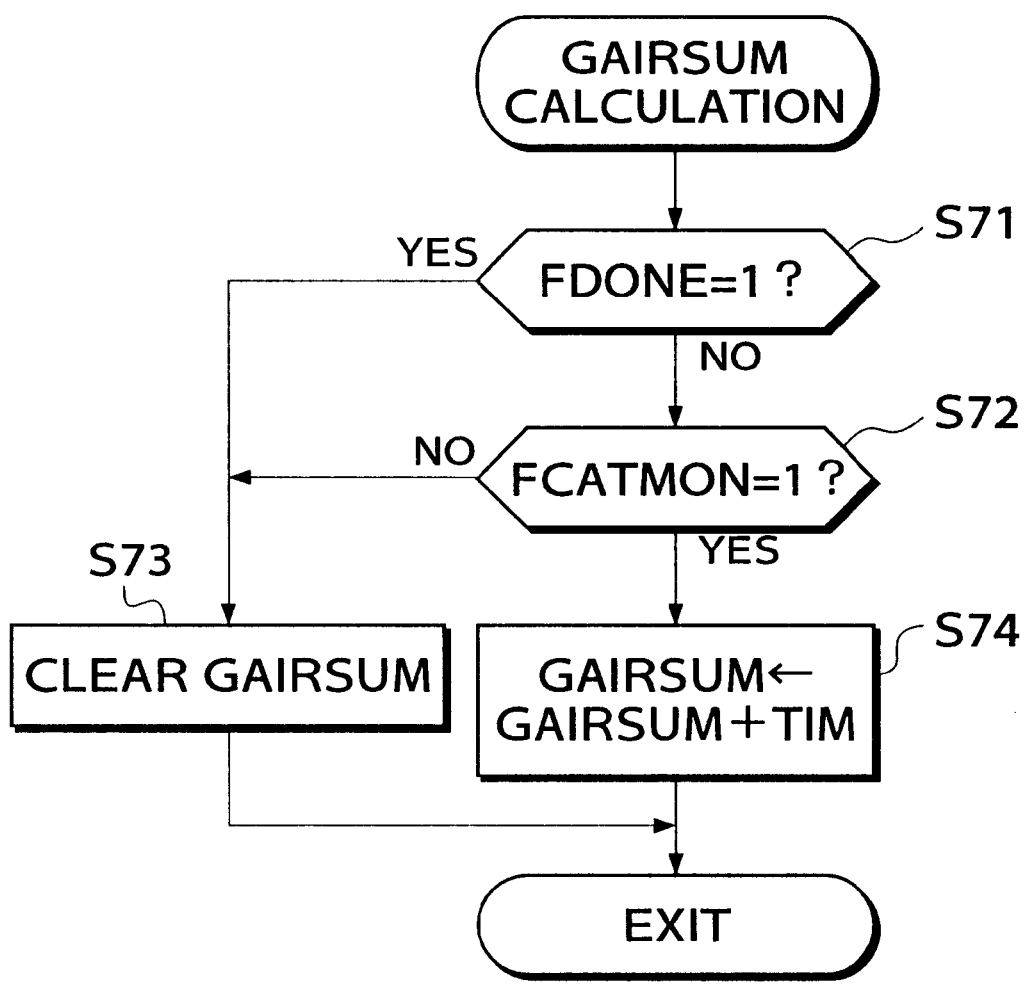
FIG. 10 is a flowchart showing a subroutine for calculating an integrated value (GAIRSUM) of a parameter representative of a flow rate of exhaust gases.

First, at a step S71 in FIG. 10, it is determined whether or not the completion flag FDONE is equal to "1". If FDONE=0 holds, then it is determined at a step S72 whether or not the measurement-starting flag FCATMON is equal to "1". If FDONE=1 holds, which means that the catalyst deterioration-monitoring has been completed, or if FCATMON=0 holds, which means that the SVO2 repetition period measurement has not been started, the flow rate integrated value GAIRSUM is set to "0" at a step S73, followed by terminating the present routine.

On the other hand, if FDONE=0 and FCATMON=1 both hold, the flow rate integrated value GAIRSUSM is calculated at a step S74, by the use of the following equation (5):

$$GAIRSUM=GAIRSUM+TIM \qquad (5)$$

where GAIRSUM on the right side represents an immediately preceding value of the GAIRSUM value, and TIM the basic value of the fuel injection period TOUT in the equation (1). As mentioned above, the basic value TIM assumes a value almost proportional to the intake air amount which in turn is almost equal to the exhaust gas flow rate, and therefore the TIM value is employed as the parameter representative of the exhaust gas flow rate. As a result, a parameter corresponding to the integrated value of the exhaust gas flow rate can be obtained without using an intake air amount sensor or an exhaust gas flow rate sensor.

By multiplying the determination time period TCHK by the thus calculated flow rate integrated value GAIRSUM, the first determination parameter OSCINDEX is obtained, and then a determination as to the catalyst deterioration is carried out by the use of the thus obtained first determination parameter OSCINDEX. As a result, the determination as to the catalyst deterioration can be free from the influence of the operating condition of the engine, which makes it possible to achieve accurate determination as to the catalyst deterioration over a wide range of the engine operating condition.

The reason why the oxygen storage capacity of the catalyst, i.e. the maximum oxygen storage amount, can be accurately estimated by using the first determination parameter OSCINDEX will be described hereinbelow:

In FIG. 8, a time period (TL) over which the sensor output SVO2 is higher than the reference voltage SVREF is a time period during which oxygen is stored in the catalyst. Over the time period TL, the correction coefficient KO2 is controlled so as to be linearly decreased with the lapse of time, so that the excess air ratio λ of exhaust gases is linearly increased with the lapse of time. Therefore, the first determination parameter OSCINDEX calculated by multiplying the determination time period TCHK by the flow rate integrated value GAIRSUM which corresponds to the integrated value of the exhaust gas flow rate, can function as a parameter proportional to the oxygen amount stored in the catalyst over the determination time period TCHK. Strictly speaking, almost half of the determination time period TCHK is a time period over which oxygen is stored in the catalyst and the remaining half of the time period is a period over which oxygen is emitted from the catalyst, which, however, does not deny the fact that the first determination parameter OSCINDEX is almost proportional to the oxygen storage capacity of the catalyst.

Referring again to FIG. 3, at a step S111, a counter NDETECT for counting the number of times of calculation ndetect of the first determination parameter OSCINDEX is incremented by "1". The count value ndetect is stored in a memory which is backed up by the battery, similarly to the first determination parameter OSCINDEX.

At the following step S112, it is determined whether or not the first determination parameter OSCINDEX calculated at the step S110 is equal to or larger than a first determination reference value LMTDC. If OSCINDEX≧LMTDC holds, the program skips to a step S114. On the other hand, if OSCINDEX<LMTDC holds, it is determined at a step S113 that the catalyst 13 is deteriorated, and then a first OK flag FOKDC is set to "0" to indicate that the catalyst is determined to be deteriorated by a first determination (step S112), and at the same time a first deterioration flag FNGDC is set to "1", followed by the program proceeding to the step S114.

At the step S114, it is determined whether or not the count value ndetect is equal to or larger than a predetermined value nDC (e.g. 6). If ndetect<nDC holds, the program skips to a step S121, whereas if ndetect≧nDC holds, the ndetect value is set to the predetermined value nDC at a step S115, followed by the program proceeding to the step S121 in FIG. 4.

At the step S121, a moving average value OSCMA of the first determination parameter OSCINDEX is calculated by the use of the following equation (6), and the calculated moving average value OSCMA is set as a second determination parameter:

$$OSCMA=\{OSCINDEX(n)+OSCINDEX(n-1)+\ldots+OSCINDEX(n-ndetect+1)\}/ndetect \quad (6)$$

where (n) represents that the parameter value is a present value, (n-1) an immediately preceding value, and (n-ndetect+1) a value obtained (ndetect-1) loops before the present loop. Values of the first determination parameter OSCINDEX have been sequentially stored in the ring buffer which is backed up by the battery. Further, the ring buffer for the OSCINDEX is initialized to "0" at the delivery, and once calculated values of the parameter OSCINDEX have been stored, the stored values are kept from being erased insofar as an accident such as removal of the battery does not happen.

Figure 11:
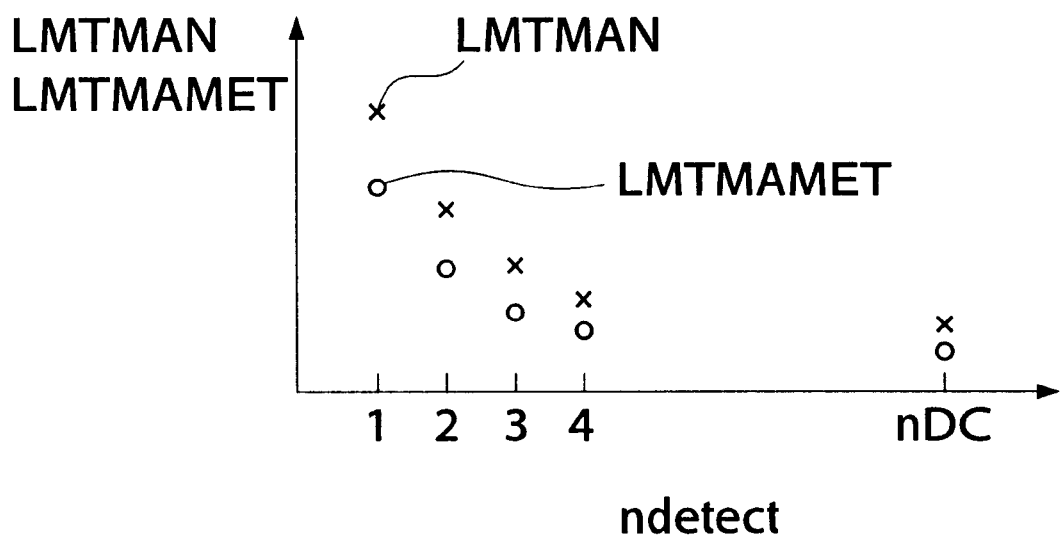
FIG. 11 shows a table for use in the process of FIG. 4.

At the following step S122, it is determined whether or not the oxidation promotion flag FSO2MET is equal to "1". If FSO2MET=1 holds, which means that the influence of the oxidation of methane in the vicinity of the downstream O2 sensor 15 is too large to be ignored, the program jumps to a step S128, wherein an LMTMAMET table whose values are marked with ○ in FIG. 11 is retrieved according to the count value ndetect to obtain a second determination reference value LMTMAMET to be applied at promotion of the oxidation. As shown in FIG. 11, the LMTMAMET table is set such that the second determination reference value LMTMAMET decreases (changes in such a direction as to make it more difficult for the catalyst to be determined as deteriorated) as the count value ndetect increases, and the second determination reference value LMTMAMET is set to a smaller value than a corresponding second determination reference value LMTMAN to be applied normally, hereinafter referred to. At the following step S129, a second determination reference value TMTMA is set to the second determination reference value LMTMAMET for oxidation promotion calculated at the step S128, and then the program proceeds to a step S130.

If FSO2MET=0 holds at the step S122, an average value SVO2MAXAVE of the maximum value SVO2MAX of the O2 sensor output SVO2 detected at the step S104 is calculated by the use of the following equation (7), at a step S123.

$$SVO2MAXAVE=SVO2MAXI/nMAX \quad (7)$$

Then, it is determined at a step S124 the average value SVO2MAXAVE is equal to or lower than the predetermined output value SVO2MET. If SVO2MAXAVE≦SVO2MET holds, the oxidation promotion flag FSO2MET is set to "1" at step S125, followed by the program proceeding to the step S128, whereas if SVO2MAXAVE>SVO2MET holds, which means that the influence of oxidation of methane is so small that it can be ignored, the program proceeds to a step S126, wherein an LMTMAN table shown in FIG. 11 whose values are marked with x is retrieved according to the count value ndetect to obtain the second determination reference value LMTMAN for normal operation. The LMTMAN table is set such that the second determination reference value LMTMAN decreases as the count value ndetect increases, and the value LMTMAN is set to a corresponding second determination reference value LMTMAMET for oxidation promotion. At the following step S127, the second determination reference value LMTMA is set to the second determination reference value LMTMAN for normal operation obtained at the step S126, followed by the program proceeding to the step S130.

The aforementioned first determination reference value LMTDC is set to a smaller value than a value of the second determination reference value LMTMAN for normal operation to be selected when ndetect=1 (a value which makes it the easiest for the catalyst to be determined as deteriorated, out of the values of the second determination reference value LMTMAN), namely, the value LMTDC is set to a value which makes it more difficult for the catalyst to be determined as deteriorated.

Then, at the step S130, it is determined whether or not the second determination parameter OSCMA calculated at the step S121 is equal to or larger than the second determination reference value LMTMA, and if OSCMA≧LMTMA holds, it is determined at a step S131 that the catalyst is normal, and hence a second OK flag FOKMA is set to "1", followed by the program proceeding to a step S133. On the other hand, if OSCMA<LMTMA holds, it is determined at a step S132 that the catalyst in the catalyst 13 is deteriorated, and hence the second OK flag FOKMA is set to "0" and at the same time a second deterioration flag FNGMA is set to "1", followed by the program proceeding to the step S133. At the step S133, the completion flag FDONE is set to "1" to indicate that the deterioration monitoring has been completed, followed by terminating the program.

The FIG. 3 program is executed at predetermined time intervals after the ignition switch is turned on. However, once the process from the step S108 to the step S133 is executed after the start of the engine, FDONE=1 holds at the step S102, and therefore the step S108 to S133 are no more executed during the operation of the engine. Thereafter, when the engine is stopped and then started again, the determination process from the step S108 to the step S133 is executed once. That is, the determination process is executed once over one operation period from the time the ignition switch is turned on to start the engine to the time the engine is stopped. In the present embodiment, by a process not shown, when the first deterioration flag FNGDC is consecutively set to "1" twice, or when the second deterioration flag FNGMA is consecutively set to "1" twice, it is finally determined that the catalyst is deteriorated. Then, an alarm lamp is lit to alert the driver to the catalyst being deteriorated. The alarm lamp is not lit unless the above condition is satisfied.

As described above, according to the present embodiment, when the maximum value SVO2MAX of the output SVO2 of the downstream O2 sensor 15 or the average value SVO2MAXAVE of the same is smaller than the predetermined output value SVO2MET, indicating that the influence of oxidation of methane in the vicinity of the downstream O2 sensor 15 is large to a non-ignorable extent. namely, the second deterioration parameter OSCMA changes in a decreasing direction even when the catalyst 13 is normal, the second determination reference value LMTMA is set to a smaller value (LMTMAMEY). As a result, it is possible to prevent the catalyst 13 from being determined as deteriorated even when it is normal, leading to accurate determination of the catalyst deterioration.

Further, since the deterioration determination is carried out based on a present value of the first determination parameter OSCINDEX at the step S112, it is possible to quickly detect a sudden deterioration of the catalyst (e.g. a deterioration due to abnormal combustion caused by a misfire, or a deterioration due to poisoning caused by deteriorated fuel), which cannot be readily detected by the determination based on the second determination parameter OSCMA. More specifically, since the second determination parameter OSCMA is a moving average value, if previous values of the first determination parameter OSCINDEX are normal and only a present value thereof decreases enough to show deterioration of the catalyst, the OSCMA value does not show a large decrease. Therefore, there is a possibility that such a sudden deterioration cannot be detected unless the number of samples is increased. However, by virtue of the determination at the step S9, such a sudden deterioration can be promptly detected.

The present invention is not limited to the above described embodiment, but various variations and modifications thereto are possible. For example, although in the above described embodiment, the degree of influence of oxidation of methane is determined based upon the average value SVO2MAXAVE of the maximum value SVO2MAX of the output SVO2 of the downstream O2 sensor 15 (step S124), alternatively it may be determined based upon an average value SVO2 AVE of the sensor output SVO2 itself. However, the use of the average value SVO@NAXAVE of the maximum value SVO@MAX is more advantageous in accurately determining the catalyst deterioration, since it is less susceptible to the influence of a changing characteristic of the sensor output SVO2, i.e. the duty thereof (the ratio between the period during which the output SVO2 is high and the period during which it is low).

Although the same determination threshold value SVO2MET is used in the determinations at the step S105 in FIG. 3 and the step S124 in FIG. 4, different determination threshold values may be used, instead.

What is claimed is:

1. In a catalyst deterioration-determining system for an internal combustion engine using a compressed natural gas and having an exhaust system, catalyst means arranged in the exhaust system, for purifying exhaust gases emitted from said engine, oxygen concentration-detecting means arranged in said exhaust system at a location downstream of said catalyst means, for detecting concentration of oxygen present in said exhaust gases, and air-fuel ratio control means for controlling an air-fuel ratio of an air-fuel mixture supplied to said engine in a feedback manner in response to an output from said oxygen concentration-detecting means, said catalyst deterioration-determining system including catalyst deterioration-determining means for determining that said catalyst means is deteriorated when a period of change of said output from said oxygen concentration-detecting means during execution of air-fuel ratio feedback control by said air-fuel ratio control means is shorter than a predetermined determination reference value, the improvement comprising:

influence degree-detecting means for detecting a degree of influence of oxidation of a particular component of said compressed natural gas in a vicinity of said oxygen concentration sensor; and determination reference value-setting means for setting said predetermined determination reference value, in dependence on the degree of influence of oxidation of said particular component detected by said influence degree-detecting means.

2. A catalyst deterioration-determining system as claimed in claim 1, wherein said influence degree-detecting means detects said degree of influence of oxidation of said particular component, based upon at least one of an average of said output from said oxygen concentration-detecting means, a maximum value of said average value, and an average value of said maximum value, which are obtained during execution of air-fuel ratio feedback control by said air-fuel ratio control means.

3. A catalyst deterioration-determining system as claimed in claim 1, wherein said determination reference value-setting means changes said predetermined determination reference value in a direction of making it more difficult to determine that said catalyst means is deteriorated, when said degree of influence of oxidation of said particular component exceeds a predetermined degree.

4. A catalyst deterioration-determining system as claimed in claim 1, wherein said influence degree-detecting means detects said degree of influence of oxidation of said particular component, based upon a result of comparison between said at least one of said average of said output from said oxygen concentration-detecting means, said maximum value of said average value, and said average value of said maximum value and a predetermined value which is set by taking temperature of said oxygen concentration sensor into account.

* * * * *

UNITED STATES PATENT AND TRADEMARK OFFICE
CERTIFICATE OF CORRECTION

PATENT NO. : 6,092,369
DATED : July 25, 2000
INVENTOR(S) : Hosogai et al.

It is certified that error appears in the above-identified patent and that said Letters Patent is hereby corrected as shown below:

<u>Title page,</u>
Item [75], Inventors, please delete "Shigeo Hosogai" and insert -- Seiichi Hosogai --

Signed and Sealed this

Seventh Day of June, 2005

JON W. DUDAS
*Director of the United States Patent and Trademark Office*